(12) United States Patent
Ballenger et al.

(10) Patent No.: US 7,291,984 B2
(45) Date of Patent: *Nov. 6, 2007

(54) METHOD OF REDUCING RMS LOAD VOLTAGE IN A LAMP USING PULSE WIDTH MODULATION

(75) Inventors: Matthew B. Ballenger, Lexington, KY (US); Ernest C. Weyhrauch, Cookeville, TN (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/051,927

(22) Filed: Feb. 4, 2005

(65) Prior Publication Data

US 2005/0110430 A1    May 26, 2005

(51) Int. Cl.
H05B 41/16 (2006.01)
H05B 37/02 (2006.01)
(52) U.S. Cl. .................. 315/246; 315/291; 315/360
(58) Field of Classification Search .............. 315/56, 315/72, 194, 246, 247, 287, 291, 307, 360, 315/DIG. 4, 209 T, 209 SC; 307/139, 151; 323/217
See application file for complete search history.

(56) References Cited

U.S. PATENT DOCUMENTS

| | | | | |
|---|---|---|---|---|
| 3,265,930 A | * | 8/1966 | Powell, Jr. ............... 315/209 R |
| 3,275,922 A | | 9/1966 | Meyer et al. ................. 321/15 |
| 3,450,891 A | * | 6/1969 | Riley .............................. 361/6 |
| 3,491,284 A | * | 1/1970 | Pascente ...................... 323/319 |
| 3,594,591 A | * | 7/1971 | Laupman ..................... 327/457 |
| 3,609,402 A | * | 9/1971 | Ferro et al. .................. 327/190 |
| 3,742,337 A | * | 6/1973 | Digneffe ...................... 323/300 |
| 3,746,970 A | * | 7/1973 | Van Cleave ................. 323/238 |
| 3,763,395 A | * | 10/1973 | Shilling et al. ............. 315/307 |
| 3,869,631 A | | 4/1975 | Anderson et al. ........... 313/217 |
| 3,886,405 A | * | 5/1975 | Kubo .......................... 315/246 |
| 3,906,302 A | * | 9/1975 | Wijsboom ............. 315/209 R |
| 4,032,817 A | * | 6/1977 | Richmond ................... 315/149 |
| 4,224,563 A | * | 9/1980 | Hardy ......................... 315/308 |
| 4,230,970 A | * | 10/1980 | Potter et al. ................ 315/307 |
| 4,308,494 A | * | 12/1981 | Gelfand et al. ............. 323/242 |
| 4,435,677 A | * | 3/1984 | Thomas ....................... 323/235 |
| 4,480,211 A | | 10/1984 | Eggers .......................... 315/70 |
| 4,500,813 A | | 2/1985 | Weedall ....................... 315/276 |
| 4,501,994 A | * | 2/1985 | Spreadbury ................. 315/307 |
| 4,540,265 A | * | 9/1985 | Harvey ........................ 396/163 |
| 4,893,063 A | | 1/1990 | Pernyeszi .................... 315/307 |
| 4,904,903 A | * | 2/1990 | Pacholok ................ 315/209 R |
| 4,922,155 A | | 5/1990 | Morris et al. ............... 315/205 |
| 4,935,691 A | * | 6/1990 | Lamar ......................... 323/323 |
| 4,988,921 A | * | 1/1991 | Ratner et al. ............... 315/159 |
| 5,387,849 A | * | 2/1995 | Sridharan ................... 315/247 |
| 5,519,311 A | | 5/1996 | Widmayer .................. 323/319 |

(Continued)

Primary Examiner—Thuy Vinh Tran
(74) Attorney, Agent, or Firm—Carlo Bessone

(57) ABSTRACT

A method of converting a line voltage to an RMS load voltage in a lamp includes modulating a load voltage with a pulse width modulation circuit that is entirely within the lamp and provides an RMS load voltage to a light emitting element of the lamp. Conduction is triggered in the pulse width modulation circuit independently of a line voltage magnitude with a time-based signal source that defines a duty cycle of the pulse width modulation circuit suitable for the RMS load voltage.

3 Claims, 3 Drawing Sheets

U.S. PATENT DOCUMENTS

| | | | |
|---|---|---|---|
| 5,576,614 A * | 11/1996 | Meads et al. | 323/239 |
| 5,585,697 A * | 12/1996 | Cote et al. | 315/157 |
| 5,596,247 A * | 1/1997 | Martich et al. | 315/56 |
| 5,859,506 A | 1/1999 | Lemke | 315/308 |
| 5,892,391 A * | 4/1999 | Hughes | 327/438 |
| 6,208,090 B1 | 3/2001 | Skilskyj et al. | 315/360 |
| 6,445,133 B1 | 9/2002 | Lin et al. | 315/57 |
| 6,870,327 B2 * | 3/2005 | Takahashi et al. | 315/248 |

* cited by examiner

Incoming voltage waveform (top) and Pulse Width Modulated voltage waveform (bottom)

METHOD OF REDUCING RMS LOAD VOLTAGE IN A LAMP USING PULSE WIDTH MODULATION

BACKGROUND OF THE INVENTION

The present invention is directed to a power controller that supplies a specified power to a load, and more particularly to a voltage converter for a lamp that converts line voltage to a voltage suitable for lamp operation.

Some loads, such as lamps, operate at a voltage lower than a line (or mains) voltage of, for example, 120V or 220V, and for such loads a voltage converter that converts line voltage to a lower operating voltage must be provided. A lower lamp operating voltage provides benefits, including the ability to use a filament wire with a larger cross section and shorter length, thereby increasing lamp efficiency, color temperature and filament efficacy, and improving sag resistance, hot shock resistance and vibration induced flickering.

The power supplied to the load may be controlled with a phase-control clipping circuit that typically includes an RC circuit and uses phase-control clipping to reduce the line voltage to an RMS load voltage suitable for operation of the light emitting element of the lamp.

A simple four-component RC phase-control clipping circuit is shown in FIG. 1 and includes a capacitor 22, a diac 24, a triac 26 that is triggered by the diac 24, and resistor 28. The resistor 28 may be a potentiometer that sets a resistance in the circuit to control a phase at which the triac 26 fires. The RMS load voltage and current are determined by the resistance and capacitance values in the clipping circuit since the phase at which the clipping occurs is determined by the RC series network and since the RMS voltage and current depend on how much energy is removed by the clipping. FIG. 2 illustrates a clipped waveform formed by a phase-control clipping circuit such as illustrated in FIG. 1.

The phase-control clipping circuit has drawbacks. As seen in FIG. 2, the voltage is applied to the lamp light emitting element (e.g., filament) part way through the power cycle. This causes a current pulse that can generate electromagnetic interference (EMI) and cause harmonic distortion (THD). Filtering elements (e.g., chokes) may be installed to reduce EMI and THD but such elements can increase the cost, weight and size of the system and can generate heat.

Another drawback of the phase-control clipping circuit is that the lamp may not operate properly when driven by a dimmer that delivers a clipped line voltage waveform to the lamp. The phase-control clipping circuit shown in FIG. 1 needs a sine wave voltage input for the phase setting components to operate correctly. If the line voltage has been clipped by a dimming circuit so that a sinusoidal voltage waveform is no longer presented to the lamp, the phase-control clipping circuit may not trigger the diac and triac as intended.

When the phase-control power controller is used in a voltage converter of a lamp, the voltage converter may be provided in a fixture to which the lamp is connected or within the lamp itself. U.S. Pat. No. 3,869,631 is an example of the latter, in which a diode is provided in an extended stem between the lamp screw base and stem press of the lamp for clipping the line voltage to reduce RMS load voltage at the light emitting element. U.S. Pat. No. 6,445,133 is another example of the latter, in which a voltage conversion circuit for reducing the load voltage at the light emitting element is divided with a high temperature-tolerant part in the lamp base and a high temperature-intolerant part in a lower temperature part of the lamp spaced from the high temperature-tolerant part.

Factors to be considered when designing a voltage converter that is to be located within a lamp include the sizes of the lamp and voltage converter, costs of materials and production, production of a potentially harmful DC load on a source of power for installations of multiple lamps, and the operating temperature of the lamp and an effect of the operating temperature on a structure and operation of the voltage converter.

SUMMARY OF THE INVENTION

An object of the present invention is to provide a novel lamp and method in which an internal voltage controller converts a line voltage to an RMS load voltage using pulse width modulation (PWM).

A further object is to provide a novel lamp with a voltage controller that is entirely within a lamp base and uses PWM to define an RMS load voltage, where the voltage controller has a bridge that supplies the RMS load voltage to a light emitting element, a switching transistor that pulse width modulates a current supplied to the bridge, and a timer that is connected to a gate of the switching transistor to turn the switching transistor on and off at a rate that defines the RMS load voltage.

A yet further object is to provide a novel lamp and method in which an internal voltage controller converts a line voltage to a suitable RMS load voltage even when the line voltage is clipped with an external dimming circuit.

DESCRIPTION OF PREFERRED EMBODIMENTS

Figure 3:
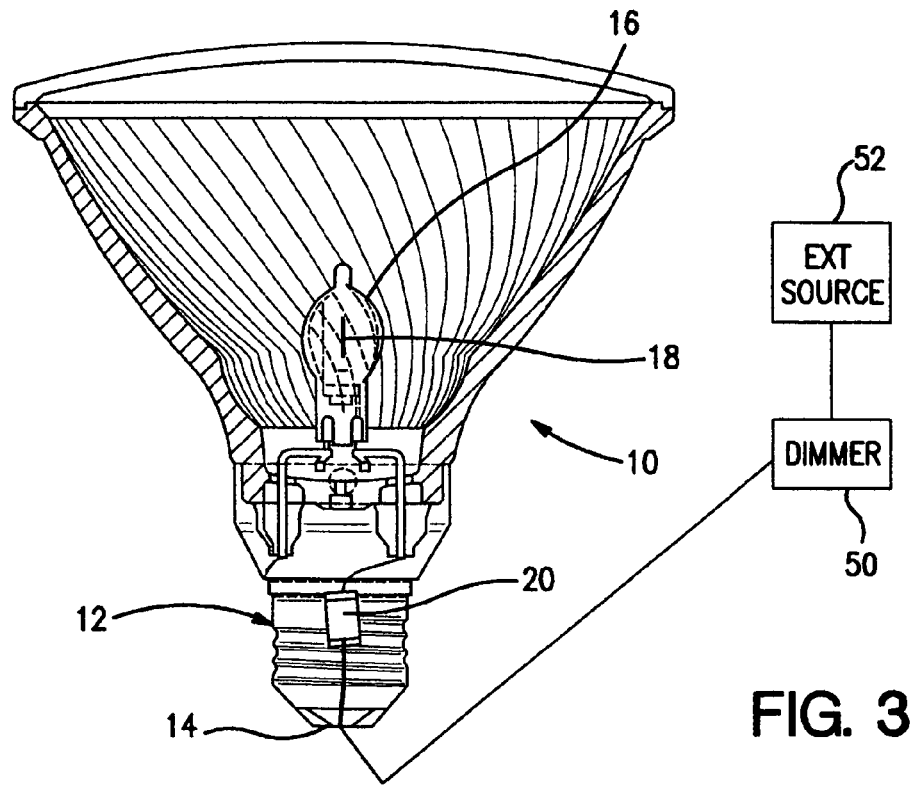
FIG. 3 is a partial cross section of an embodiment of a lamp of the present invention.

With reference to FIG. 3, a lamp 10 includes a base 12 that is arranged and adapted to fit into a lamp socket and has an exterior lamp terminal 14 that is adapted to be connected to line voltage, a light-transmitting envelope 16 attached to the base 12 and housing a light emitting element 18 (an incandescent filament in the embodiment of FIG. 3), and a lamp internal voltage conversion circuit 20 for converting a line voltage at the lamp terminal 14 to a lower lamp operating voltage.

The voltage conversion circuit 20 is housed entirely within the base 12 (that is, entirely within the part of the lamp that is arranged and adapted to fit into a lamp socket such as shown in FIG. 3) and connected in series between the lamp terminal 14 and the light emitting element 18. The voltage conversion circuit 20 may be an integrated circuit in a suitable package as shown schematically in FIG. 3.

While FIG. 3 shows the voltage conversion circuit 20 in a parabolic aluminized reflector (PAR) halogen lamp, the voltage conversion circuit 20 may be used in any incandescent lamp when placed in series between the light emitting element (e.g., filament) and a connection to a line voltage (e.g., lamp terminal).

Figure 4:
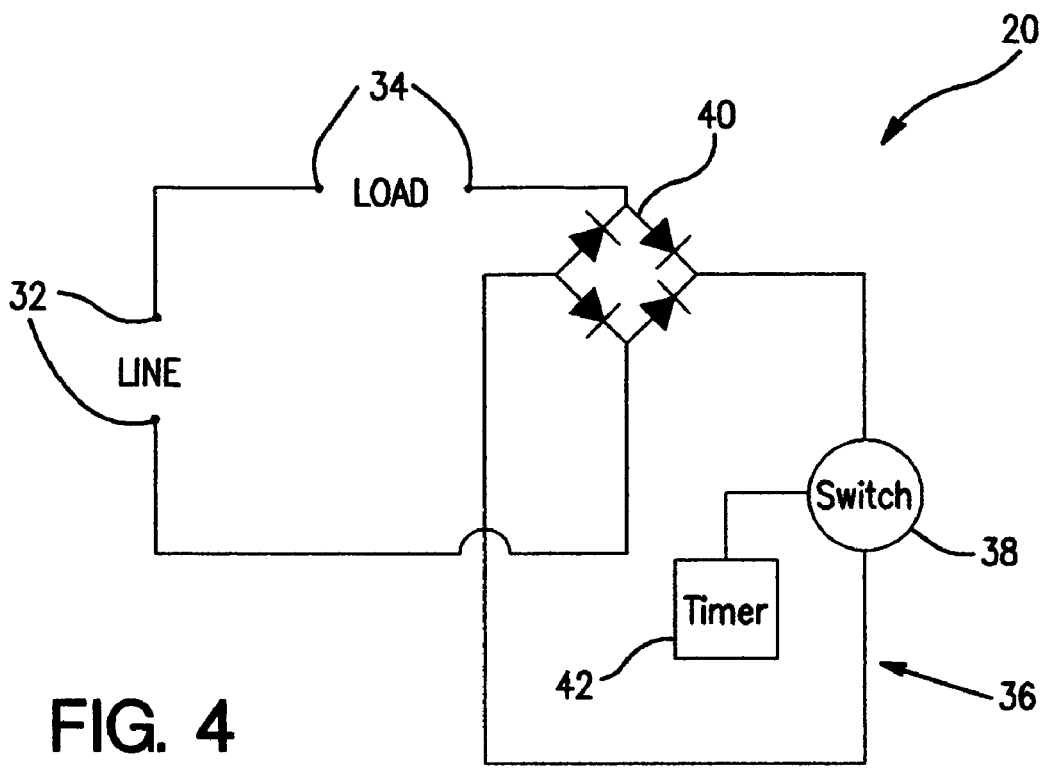
FIG. 4 is a schematic circuit diagram showing an embodiment of the PWM voltage controller of the present invention.

With reference to FIG. 4 that illustrates an embodiment of the present invention, the voltage conversion circuit 20 includes line terminals 32 for a line voltage and load terminals 34 for a load voltage, and a PWM circuit 36 that pulse width modulates the load voltage and that is connected to the line and load terminals. The PWM circuit 36 includes a transistor switch 38 that pulse width modulates the current supplied to a bridge 40 that provides the RMS load voltage to the lamp, and a time-based signal source 42 that sends time-based signals to a gate of the transistor switch 38. The frequency and duration of the time-based signals determines the total time per cycle that the transistor switch is ON, which defines the RMS load voltage.

In other words, lamp 10 includes lamp voltage conversion circuit 20 that is inside the lamp and connected to exterior lamp terminal 14, where the voltage conversion circuit includes PWM circuit 36 that pulse width modulates a load voltage and provides an RMS load voltage to light emitting element 18 in the lamp, and where PWM circuit 36 has a transistor switch 38 and a time-based signal source 42 that triggers conduction of the transistor switch to define the RMS load voltage.

Figure 5:
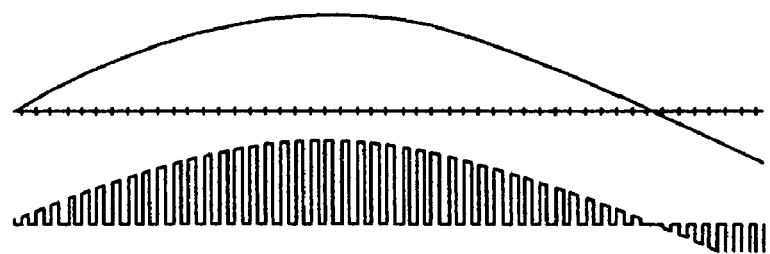
FIG. 5 is a graph depicting the pulse width modulation of the load voltage of the present invention.

In operation, the time-based signal source 42 generates signals (e.g., pulses) whose frequency and duration provide a duty cycle that is appropriate for the desired RMS load voltage. The signals are applied to the gate of the transistor switch so that the voltage applied to the light emitting element is switched ON and OFF at much greater speed than the line voltage frequency (typically 50-60 Hz). The frequency of the signals is desirably higher than the audible range (i.e., above about 20 kHz). FIG. 5 shows an example of an incoming voltage waveform and a pulse width modulated voltage waveform (the frequency being reduced to illustrate the modulation).

Since the voltage conversion circuit is not divided into separate parts, such as the high temperature tolerant and intolerant parts in the above-cited U.S. Pat. No. 6,445,133, the cost for the circuit is reduced and manufacturing complexity is reduced. Further, since the voltage conversion circuit is not in the stem and the size of the stem is not affected by the addition of the circuit within the lamp (see the extended stem in the above-cited U.S. Pat. No. 3,869, 631), the complexity of the stem and the manufacturing cost thereof and the size of the lamp are reduced.

The addition of the PWM voltage controller inside the lamp base as an integral component of the lamp, rather than separately external to the lamp, permits the use of optimized low-voltage filaments in lamps intended for use with standard sockets, thereby improving lamp beam performance, color temperature, efficacy, sag resistance, hot shock resistance, and vibration-induced flickering resistance.

While conventional RC phase-control clipping circuits are very sensitive to fluctuations in the line voltage magnitude, the present invention provides a power controller that operates substantially independently of the incoming line voltage magnitude and waveform because no component of the PWM voltage controller is dependant on the magnitude or waveform of the incoming signal. Additionally, because the current is drawn from the incoming signal equally during all periods of the input cycle, PWM of load voltage avoids the phase-control clipping pulses that cause EMI and THD in the prior art. This advantage is particularly significant when a large number of lamps are connected to the same supply circuit.

Figure 6:
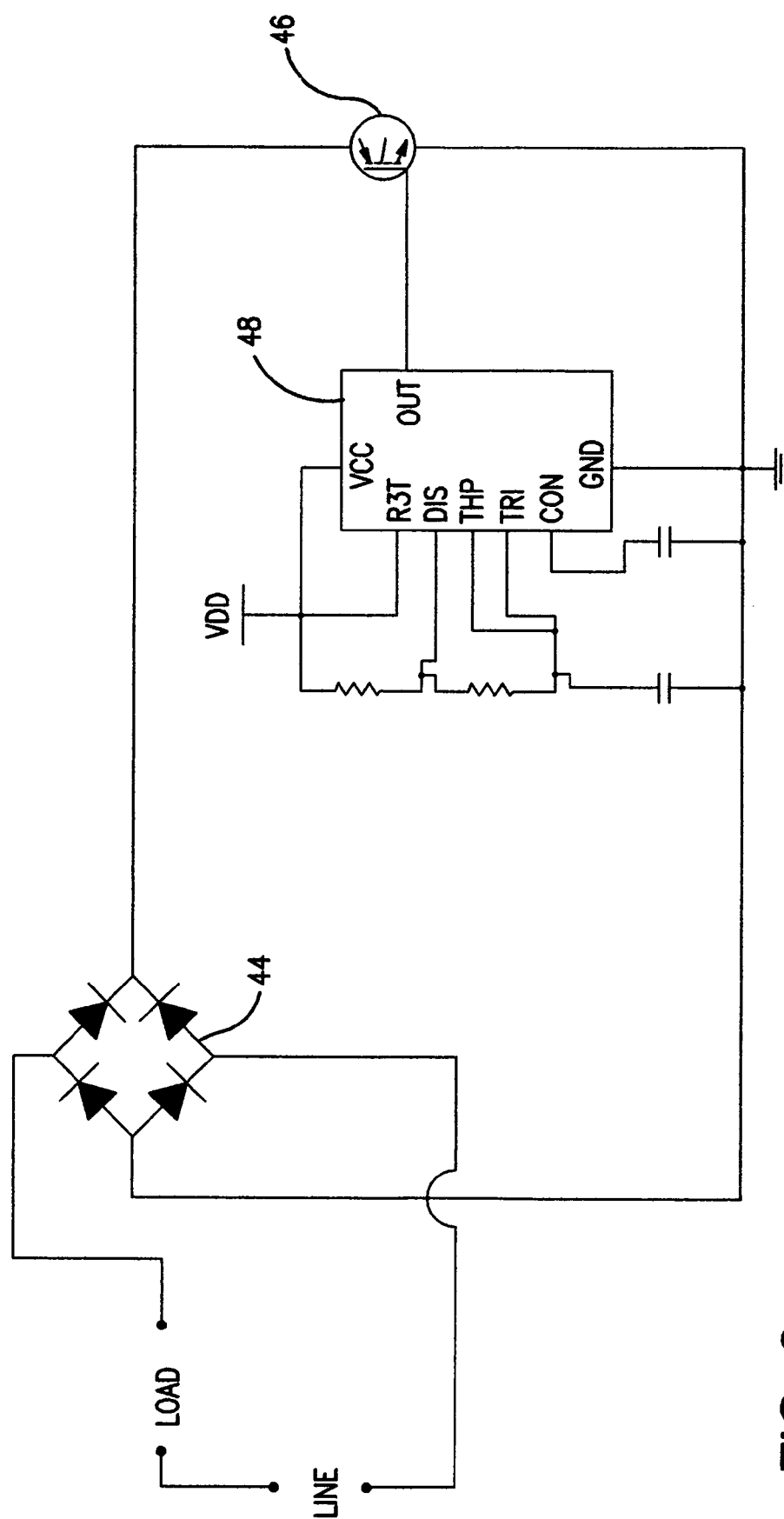
FIG. 6 is a circuit diagram of a further embodiment of the present invention.

With reference now to FIG. 6, a particular embodiment of the present invention includes a full-wave bridge 44, an insulated gate bipolar transistor 46 (which alternatively may be a MOSFET), and a timer 48 such as the known "555" timer (which alternatively may be a programmable microcontroller, pulse generator, or clock). Inputs to the timer 48 may be provided by including appropriate circuitry such as the connections, resistors and capacitors in FIG. 6, which are shown by way of example. The timer desirably is or operated to be astable (not having a stable state at which it can rest). A heat sink (not shown) may be attached to the transistor switch as needed.

Figure 1:
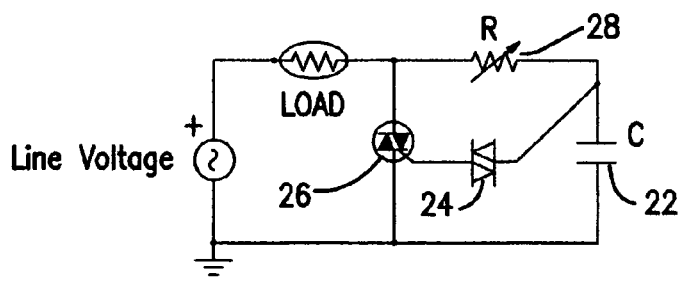
FIG. 1 is a schematic circuit diagram of a phase-controlled clipping circuit of the prior art.
Figure 2:
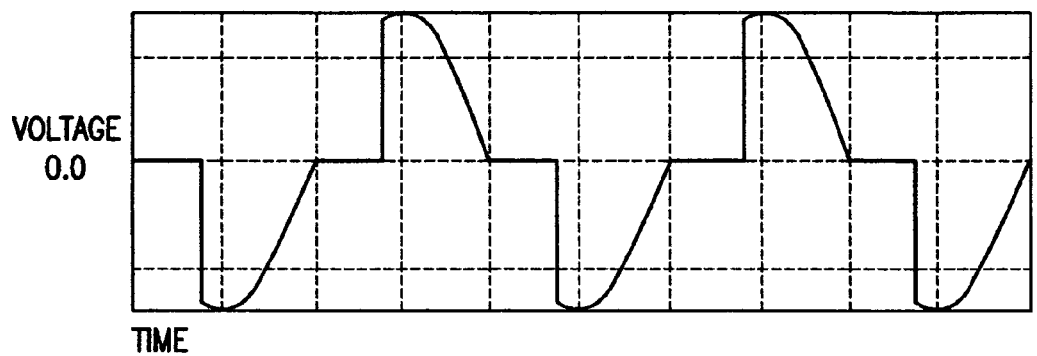
FIG. 2 is a graph illustrating voltage clipping in the phase-controlled clipping circuit of FIG. 1.

With reference again to FIG. 3, the lamp may also include a dimmer 50 that clips a line voltage. The dimmer 50 is external to the lamp 10 and connected between exterior lamp terminal 14 and an external source of the line voltage 52. The dimmer may be a conventional forward or reverse phase-control dimmer, or pulse width modulation dimmer, that delivers a clipped line voltage waveform (such as the forward clipped waveform shown in FIG. 2) to the line terminals of the lamp. The PWM voltage controller of the present invention operates independently of line voltage magnitude and waveform and thus is not affected by the clipping.

While embodiments of the present invention have been described in the foregoing specification and drawings, it is to be understood that the present invention is defined by the following claims when read in light of the specification and drawings.

What is claimed is:

1. A method of converting a line voltage to an RMS load voltage in a lamp, the method comprising the steps of:
    pulse width modulating a load voltage with a pulse width modulation circuit that is entirely within the lamp and provides an RMS load voltage to a light emitting element of the lamp;
    triggering conduction in the pulse width modulation circuit independently of a line voltage magnitude with a time-based signal source that defines a duty cycle of the pulse width modulation circuit suitable for the RMS load voltage; and
    clipping the line voltage in a dimmer circuit before the pulse width modulating step.

2. The method of claim 1, wherein the time-based signal source is one of a pulse generator, a microcontroller and a clock.

3. The method of claim 1, wherein the pulse width modulation circuit includes a transistor switch whose gate receives signals from the time-based signal source to trigger conduction of the pulse width modulation circuit.

* * * * *